United States Patent Office 3,473,913
Patented Oct. 21, 1969

3,473,913
HERBICIDAL COMPOSITION AND METHOD
Warren H. Zick, Pittsburgh, Pa., assignor to Velsicol
Chemical Corporation, Chicago, Ill., a corporation
of Delaware
No Drawing. Continuation-in-part of application Ser. No.
592,280, Nov. 7, 1966. This application Jan. 23, 1969,
Ser. No. 793,531
Int. Cl. A01n 9/20
U.S. Cl. 71—115                                6 Claims

ABSTRACT OF THE DISCLOSURE

This invention discloses new herbicidal compositions which comprise an inert carrier and, as essential active ingredients, in a quantity toxic to weeds, a combination of a first compound selected from the group consisting of N-methoxy-2-methyl-4-chlorophenoxyacetamide and its sodium and potassium salts and a second compound selected from the group consisting of 2-methoxy-3,6-dichlorobenzoic acid, its dimethylamine salt, its sodium salt and its potassium salt.

---

This application is a continuation-in-part of a copending application Ser. No. 592,280, filed Nov. 7, 1966, now abandoned.

This invention relates to new herbicidal compositions. More particularly, this invention relates to new herbicidal compositions which are effective in the control of a broad spectrum of weeds.

Prior to the present invention many organic and inorganic substances have been proposed and used in attempts to control weeds. While some of these substances are partially successful, the problem of controlling the vast number of species of undesirable plant life still exists. The previously proposed substances are effective in the control of certain weeds, but no compound or composition has been discovered which can effectively control all the species of weeds without being excessively toxic and indescriminately destroying both desirable and undesirable plant life.

It is therefore, one object of the present invention to provide herbicidal compositions for the control of a broad spectrum of weeds.

It is a further object of the present invention to provide herbicidal compositions capable of being applied to crops at rates compatible to the crops and which are effective in the control of a broad spectrum of weeds.

These and other objects of the present invention will be readily apparent from the ensuing description.

Herbicidally active compounds selected from the group consisting of 2-methoxy-3,6-dichlorobenzoic acid, its dimethylamine salt, its sodium salt and its potassium salt have been found to be generally effective in the control of certain weeds such as dock, mustard, pigweed, velvet leaf, spike rush and the like, but generally fail to destroy other weeds. These herbicides have been tried in an attempt to control the entire wide spectrum of weeds at rates which are noninjurious to crops, but the attempts have failed and the weeds continue to thrive, causing substantial economic losses through competition with crops, harvesting problems, low yield, and the like.

Unexpectedly it has been discovered that the use of combinations of a first compound selected from the group consisting of N-methoxy-2-methyl-4-chlorophenoxyacetamide and its sodium and potassium salts with at least one second compound selected from the group consisting of 2-methoxy-3,6-dichlorobenzoic acid, its dimethylamine salt, its sodium salt and its potassium salt provide herbicidal compositions which are effective in the control of a broad spectrum of weeds and give results which are unattainable at comparable rates with separate compositions of the individual herbicides.

For example, these combinations often act more rapidly in the control of weeds in crop areas and yet have residual herbicidal effectiveness over a longer period of time than the individual herbicidal components at equivalent rates. Also, crops are unexpectedly tolerant to these combinations.

Though generally, the herbicidal compositions of the present invention include combinations of two compounds, it is within the scope of this invention to include more than two compounds in the compositions.

The sodium and potassium salts of N-methoxy-2-methyl-4-chlorophenoxyacetamide can be prepared from the N-methoxy-2-methyl-4-chlorophenoxyacetamide by treating with an equimolar amount of sodium or potassium hydroxide. The reaction can be performed by heating, if required, in a solvent such as an alcohol or an alcohol-ketone mixture, for example, an ethanol and dioxane mixture. The desired salt can be recovered from the reaction mixture by evaporating the solvent, if used, by extraction, and the like.

For practical use as herbicides, the combinations of active ingredients of this invention are generally incorporated into herbicidal compositions which comprise an inert carrier and a herbicidally toxic amount of the combination. Such herbicidal compositions, which can also be called formulations, enable the combination to be applied conveniently to the site of the weed infestation in any desired quantity. These compositions can be solids such as dusts, granules, or wettable powders; or they can be liquids such as solutions, aerosols, or emulsifiable concentrates.

For example, dusts can be prepared by grinding and blending the active compounds with a solid inert carrier such as the talcs, clays, silicas, pyrophyllite, and the like. Granular formulations can be prepared by impregnating the active compounds in the combination, usually dissolved in a suitable solvent, onto and into granulated carriers such as the attapulgites or the vermiculites, usually of a particle size range of from about 0.3 to 1.5 mm. or by coating an inert carrier with a wettable powder formulation of the combination. Wettable powders, which can be dispersed in water or oil to any desired concentration of the combination, can be prepared by incorporating wetting agents into concentrated dust compositions or by mixing the ingredients as in the case of the alkali metal salts of the active ingredients.

In some cases the active compounds in the combinations are sufficiently soluble in water or the common organic solvents such as kerosene or xylene so that they can be used directly as solutions in these solvents. Frequently, solutions of herbicides can be dispersed under superatmospheric pressure as aerosols. However, preferred liquid herbicidal compositions are emulsifiable concentrates, which comprise the combination according to this invention and as the inert carrier, a solvent, and, in the case of an emulsifiable concentrate, an emulsifier. Such concentrates can be extended with water and/or oil to any desired concentration of the combination for application as sprays to the site of the weed infestation. The emulsifiers most commonly used in these concentrates are nonionic or mixtures of nonionic with anionic surface-active agents. With the use of some emulsifier systems an inverted emulsion (water-in-oil) can be prepared for direct application to weed infestations.

The compositions of this invention can be applied as herbicides in any manner recognized by the art. One method for the control of weeds comprises contacting the locus of said weeds with a herbicidal composition comprising an inert carrier and as an essential active ingredient, in a quantity which is herbicidally toxic to said weeds, a composition of the present invention. The concentration of the new compositions of this invention in the formulation will vary greatly with the type of formulation and the purpose for which it is designed, but generally the herbicidal compositions will comprise from about 0.05 to about 95 percent by weight of the active combinations of this invention. In a preferred embodiment of this invention, the herbicidal compositions will comprise from about 5 to about 75 percent by weight of the active combinations. The compositions can also comprise such additional substances as other pesticides, such as insecticides, nematocides, fungicides, and the like; stabilizers; spreaders; deactivators; adhesives; stickers; fertilizers; activators; synergists; and the like.

Weeds are undesirable plants in their growing where they are not wanted, having no economic value, and interfering with the production of cultivated crops or with the welfare of livestock. Many types of weeds are known, including annuals such as pigweed, lambsquarters, foxtail, crabgrass, wild mustard, field pennycress, ryegrass, goosegrass, chickweed, wild oats, velvet leaf, purselane, barnyard grass, knotweed, cocklebur, wild buckwheat, kochia, medic and smartweed; biennials such as wild carrot, great burdock, mullein, round-leaved mallow, blue thistle, bull thistle, hounds-tongue, moth mullein, matricaria and purple star thistle; or perennials such as white cockle, dandelion, campanula, perennial ryegrass, quackgrass, Johnson grass, Canada thistle, hedge bindweed, Bermuda grass, sheep sorrel, curly dock, nutgrass, field chickweed, and winter-cress. Similarly, such weeds can be classified as broadleaf or grassy weeds. It is economically desirable to control the growth of such weeds without damaging beneficial plants or livestock.

The new compositions of this invention are particularly valuable for weed control because they are toxic to many species and groups of weeds while they are relatively non-toxic to many beneficial plants. The exact amount of composition required will depend on a variety of factors, including the hardiness of the particular weed species, weather, type of soil, method of application, the kind of beneficial plants in the same area, and the like. Thus, while the application of up to only about one or two ounces of the combination of active compounds per acre may be sufficient for good control of a light infestation of weeds growing under adverse conditions, the application of ten pounds or more of the combination of active compounds per acre may be required for good control of a dense infestation of hardy perennial weeds growing under favorable conditions.

The ratio of the first compound N-methoxy-2-methyl-4-chlorophenoxyacetamide, its sodium or potassium salts, to the second compound 2-methoxy-3,6-dichlorobenzoic acid, its dimethylamine salt, its sodium salt or its potassium salt, which can be effectively used in the compositions of the present invention can range from about 1 to 5 to about 5 to 1 by weight.

Some typical herbicidal compositions which can be used in the method of this invention are shown in the following examples, in which all quantities given are in parts by weight.

EXAMPLE 1.—PREPARATION OF A WETTABLE POWDER

The following ingredients are mixed thoroughly until a homogeneous mixture is obtained. This powder is mixed with water immediately before application to give an aqueous solution containing the desired concentration of the combination of active compounds for use as a spray.

Potassium salt of N-methoxy-2-methyl-4-chlorophenoxyacetamide _____ 100
Potassium 2-methoxy-3,6-dichlorobenzoate _____ 20

EXAMPLE 2.—PREPARATION OF A WETTABLE POWDER

The following components are mixed intimately in conventional mixing or blending equipment and are then ground to a powder having an average particle size of less than about 50 microns. The finished powder is dispersed in water to give the desired concentration of the combination of active compounds.

Sodium 2-methoxy-3,6-dichlorobenzoate _____ 50
N-methoxy - 2 - methyl - 4 - chlorophenoxyacetamide _____ 10
Fuller's earth _____ 22.75
Sodium lauryl sulfate _____ 2
Methyl cellulose _____ .25

EXAMPLE 3.—PREPARATION OF A WETTABLE POWDER

The following components are mixed intimately in conventional mixing or blending equipment and are then ground to a desired particle size. Immediately prior to application, the finished powder is dispersed in water to give the desired concentration of the combination of active compounds.

N-methoxy-2-methyl-4-chlorophenoxyacetamide ____ 50
Dimethylamine salt of 2-methoxy-3,6-dichlorobenzoic acid _____ 20
Fuller's earth _____ 25
Sodium lauryl sulfate _____ 3
Methyl cellulose _____ 2

EXAMPLE 4.—PREPARATION OF A DUST

The following ingredients are mixed thoroughly and then ground to an average particle size of less than about 50 microns to give a dust suitable for application with conventional dusting equipment.

N-methoxy-2-methyl-4-chlorophenoxyacetamide ___ 5
2-methoxy-3,6-dichlorobenzoic acid _____ 5
Talc _____ 90

The unexpected herbicidal activity of the combinations of this invention was demonstrated by experiments carried out for the pre-emergence control of crabgrass. In these experiments small plastic greenhouse pots filled with dry soil were seeded with crabgrass. Twenty-four hours or less after seeding the pots were sprayed with water until the soil was wet and the test compounds formulated as aqueous emulsions of acetone solutions containing emulsifiers were sprayed at the indicated concentrations on the surface of the soil. After spraying, the soil containers were placed in the greenhouse and provided with supplementary heat as required and daily or more frequent watering. The plants were maintained under these conditions for a period of from 15 to 21 days at which time the condition of the plants and the degree of injury to the plants were rated on a scale of from 0 to 10, as follows: 0=no injury, 1, 2=slight injury, 3, 4=moderate injury, 5, 6=moderately severe injury, 7, 8, 9=severe injury and 10=death. The unusual effectiveness of these combinations as compared to the individual components is demonstrated by the results of these experiments as follows:

| Test Compounds | Concentration of Test Compound in lbs./acre | Injury Rating |
| --- | --- | --- |
| Dimethylamine salt of 2-methoxy-3,6-dichlorobenzoic acid | 0.2 | 2 |
| N-methoxy-2-methyl-4-chlorophenoxyacetamide | 0.25 | 3.5 |
| Dimethylamine salt of 2-methoxy-3,6-dichlorobenzoic acid + N-methoxy-2-methyl-4-chlorophenoxyacetamide | 0.2+0.25 | 8 |

The combinations of the present invention are also unusually effective as herbicides as compared to other combinations of well known herbicides, or example in one experiment field test were conducted for the control of campanula. In these tests the combinations listed below, in the form of aqueous emulsions of acetone solutions containing emulsifiers, were sprayed at the indicated dosage on several plots containing the turf weed. Forty-two days after application, the plots were observed and the weed control as compared to untreated plots was recorded. Some of the results of these experiments are as follows:

| Test Compounds | Concentration of Test Compounds in lbs./acre | Percent Control |
|---|---|---|
| Dimethylamine salt of 2-methoxy-3,6-dichlorobenzoic acid + N-methoxy-2-methyl-4-chlorophenoxyacetamide | 0.5+1.0 | 100 |
| Dimethylamine salt of 2-methoxy-3,6-dichlorobenzoic acid + N-methoxy-2-methyl-4-chlorophenoxyacetamide | 1.0+1.0 | 100 |
| Dimethylamine salt of 2-methoxy-3,6-dichlorobenzoic acid + 2,4-D | 0.5+1.0 | 0 |
| 2,4-D + 2,4,5-T | 1.0+1.0 | 0 |
| 2,4-D | 2.0 | 50 |

I claim:
1. A herbicidal composition comprising an inert carrier and as essential active ingredients a combination of a first compound selected from the group consisting of N-methoxy-2-methyl-4-chlorophenoxyacetamide and its sodium and potassium salts and a second compound selected from the group consisting of 2-methoxy-3,6-dichlorobenzoic acid, its dimethylamine salt, its sodium salt and its potassium salt.

2. The herbicidal composition of claim 1 wherein the ratio of the first compound to the second compound is from about 1 to 5 to about 5 to 1 by weight.

3. The herbicidal composition of claim 1 wherein the first compound is N-methoxy-2-methyl-4-chlorophenoxyacetamide and the second compound is the dimethylamine salt of 2-methoxy-3,6-dichlorobenzoic acid.

4. The herbicidal composition of claim 1 wherein the first compound is the potassium salt of N-methoxy-2-methyl-4-chlorophenoxyacetamide and the second compound is the dimethylamine salt of 2-methoxy-3,6-dichlorobenzoic acid.

5. The herbicidal composition of claim 1 wherein the first compound is the potassium salt of N-methoxy-2-methyl-4-chlorophenoxyacetamide and the second compound is the potassium salt of 2-methoxy-3,6-dichlorobenzoic acid.

6. A method of controlling weeds which comprises contacting said weeds with a herbicidal composition of claim 1.

References Cited

UNITED STATES PATENTS 3,166,591  1/1965  Richter.
3,168,561  2/1965  Richter.
3,333,943  8/1967  Richter et al.

JAMES O. THOMAS, JR., Primary Examiner

U.S. Cl. X.R.

71—118